US011438336B2

(12) United States Patent
Lelcuk et al.

(10) Patent No.: US 11,438,336 B2
(45) Date of Patent: Sep. 6, 2022

(54) BLOCKCHAIN-BASED ADMISSION PROCESSES FOR PROTECTED ENTITIES

(71) Applicant: RADWARE, LTD., Tel Aviv (IL)

(72) Inventors: Alon Lelcuk, Ramot Meir (IL); David Aviv, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 0 days.

(21) Appl. No.: 17/132,695

(22) Filed: Dec. 23, 2020

(65) Prior Publication Data

US 2021/0152557 A1 May 20, 2021

Related U.S. Application Data

(63) Continuation of application No. 15/994,414, filed on May 31, 2018, now Pat. No. 11,019,059.
(Continued)

(51) Int. Cl.
*H04L 9/40* (2022.01)
*G06Q 20/38* (2012.01)
(Continued)

(52) U.S. Cl.
CPC ......... *H04L 63/10* (2013.01); *G06Q 20/3823* (2013.01); *H04L 9/0637* (2013.01);
(Continued)

(58) Field of Classification Search
CPC ... H04L 63/10; H04L 9/3213; H04L 2209/38; H04L 2209/56; H04L 9/3239;
(Continued)

(56) References Cited

U.S. PATENT DOCUMENTS 7,721,107 B2 5/2010 Golle et al.
9,424,414 B1 8/2016 Demirjian et al.
(Continued)

FOREIGN PATENT DOCUMENTS

CN 107079036 A 8/2017
KR 101837169 B1 3/2018
(Continued)

OTHER PUBLICATIONS

Alexopoulos et al., "Towards Blockchain-Based Collaborative Intrusion Detection Systems", Telecooperation Group, Oct. 2017, p. 1-13.
(Continued)

*Primary Examiner* — Michael R Vaughan
(74) *Attorney, Agent, or Firm* — M&B IP Analysts, LLC (57) ABSTRACT

A method and system for controlling access to a protected entity. The method includes receiving a redirected client request to access the protected entity that the protected entity denied; granting, in response to the received redirected request, access tokens of a first type to a client; identifying a conversion transaction identifying a request to convert the first type of access tokens with access tokens of a second type, the transaction designating the protected entity; determining a conversion value for converting first-type access tokens into second-type of access tokens, the conversion value being based on at least one access parameter; converting, using the conversion value, a first sum of the first-type access tokens into a second sum of second-type access tokens; and granting the client access to the protected entity when the sum of second-type of access tokens is received as a payment from the protected entity.

14 Claims, 7 Drawing Sheets

Related U.S. Application Data (60) Provisional application No. 62/663,132, filed on Apr. 26, 2018.

(51) Int. Cl.
*H04L 9/06* (2006.01)
*H04L 9/32* (2006.01)

(52) U.S. Cl.
CPC ........ *H04L 9/3213* (2013.01); *H04L 63/1441* (2013.01); *H04L 63/20* (2013.01); *H04L 2209/38* (2013.01); *H04L 2463/144* (2013.01)

(58) Field of Classification Search
CPC .. H04L 63/12; G06Q 20/3823; G06Q 20/381; G06Q 2220/00
See application file for complete search history.

(56) References Cited

U.S. PATENT DOCUMENTS

| | | |
|---|---|---|
| 9,426,182 B1 | 8/2016 | Zeljko et al. |
| 9,452,355 B1 | 9/2016 | Lin |
| 9,514,293 B1 | 12/2016 | Moritz et al. |
| 9,705,895 B1 | 7/2017 | Gutzmann |
| 9,723,005 B1 | 8/2017 | McInerny et al. |
| 9,807,092 B1 | 10/2017 | Gutzmann |
| 10,049,202 B1 | 8/2018 | Johansson et al. |
| 10,097,583 B1 | 10/2018 | Demirjian et al. |
| 10,268,817 B1 | 4/2019 | Pham et al. |
| 10,282,557 B1 | 5/2019 | Pore et al. |
| 10,587,596 B1 | 3/2020 | Sahar et al. |
| 2006/0156385 A1 | 7/2006 | Chiviendacz et al. |
| 2007/0150934 A1 | 6/2007 | Fiszman et al. |
| 2010/0037319 A1 | 2/2010 | Steeves et al. |
| 2010/0162357 A1 | 6/2010 | Chickering et al. |
| 2010/0222142 A1 | 9/2010 | Mori |
| 2012/0023554 A1 | 1/2012 | Murgia et al. |
| 2012/0144501 A1 | 6/2012 | Vangpat et al. |
| 2013/0179958 A1 | 7/2013 | Fujiwara et al. |
| 2014/0325223 A1 | 10/2014 | Turgeman et al. |
| 2014/0325645 A1 | 10/2014 | Turgeman et al. |
| 2015/0317463 A1 | 11/2015 | Herunde et al. |
| 2015/0356555 A1 | 12/2015 | Pennanen |
| 2016/0012424 A1 | 1/2016 | Simon et al. |
| 2016/0162897 A1 | 6/2016 | Feeney |
| 2016/0224803 A1 | 8/2016 | Frank et al. |
| 2016/0292592 A1 | 10/2016 | Patthak et al. |
| 2016/0328545 A1 | 11/2016 | Chan et al. |
| 2016/0330235 A1 | 11/2016 | Thompson |
| 2017/0048234 A1 | 2/2017 | Lohe et al. |
| 2017/0149560 A1 | 5/2017 | Shah |
| 2017/0221052 A1 | 8/2017 | Sheng et al. |
| 2017/0237570 A1 | 8/2017 | Vandervort |
| 2017/0243208 A1 | 8/2017 | Kurian et al. |
| 2017/0244707 A1 | 8/2017 | Johnsrud et al. |
| 2017/0293912 A1 | 10/2017 | Furche et al. |
| 2017/0323392 A1 | 11/2017 | Kasper et al. |
| 2017/0366564 A1 | 12/2017 | Ping et al. |
| 2017/0366566 A1 | 12/2017 | Demirjian et al. |
| 2018/0060496 A1 | 3/2018 | Bulleit et al. |
| 2018/0068130 A1 | 3/2018 | Chan et al. |
| 2018/0096175 A1 | 4/2018 | Schmeling et al. |
| 2018/0197172 A1 | 7/2018 | Coburn et al. |
| 2018/0225466 A1 | 8/2018 | Ducatel et al. |
| 2018/0225469 A1 | 8/2018 | Daniel et al. |
| 2018/0332063 A1 | 11/2018 | Ford |
| 2019/0034889 A1* | 1/2019 | Brock .................... G06Q 20/36 |
| 2019/0073666 A1 | 3/2019 | Ortiz et al. |
| 2019/0172026 A1 | 6/2019 | Vessenes et al. |
| 2019/0184286 A1 | 6/2019 | Du et al. |
| 2019/0220592 A1 | 7/2019 | Liu et al. |
| 2019/0334717 A1 | 10/2019 | Lelcuk et al. |
| 2019/0334904 A1* | 10/2019 | Lelcuk ................ H04L 63/1441 |
| 2019/0370793 A1 | 12/2019 | Zhu et al. |
| 2019/0370813 A1 | 12/2019 | Bravick et al. |
| 2020/0027089 A1 | 1/2020 | Kuchar et al. |
| 2020/0028853 A1 | 1/2020 | Ford et al. |
| 2021/0243188 A1 | 8/2021 | Grocutt |

FOREIGN PATENT DOCUMENTS

| | | |
|---|---|---|
| KR | 101837170 B1 | 4/2018 |
| WO | 2017021154 A1 | 2/2017 |
| WO | 2017136956 A1 | 8/2017 |

OTHER PUBLICATIONS

The First Foreign Office Action for European Patent Application No. 19730655.8 dated Jan. 13, 2022, EPO, Munich, Germany.
The First Foreign Office Action for European Patent Application No. 19730656.2 dated Jan. 13, 2022, EPO, Munich, Germany.
Boyd, et al., "Fair Client Puzzles from the Bitcoin Blockchain," Norwegian University of Science and Technology, Norway, 2016, pp. 161-177.
Ho, et al., "Statistical Analysis of False Positives and False Negatives From Real Traffic with intrusion Detection/Prevention Systems," IEEE Communications Magazine, vol. 50, No. 3, Mar. 2012, pp. 146-154.
International Search Report and Written Opinion of International Searching Authority for PCT/US2019/027476, ISA/RU, Moscow, Russia, dated Aug. 8, 2019.
International Search Report and Written Opinion of International Searching Authority for PCT/US2019/028029, ISA/RU, Moscow, Russia, dated Aug. 26, 2019.
International Search Report and Written Opinion of International Searching Authority for PCT/US2019/028031, ISA/RU, Moscow, Russia, dated Aug. 8, 2019.
Kang, et al., "Online Game Bot Detection Based on Party-Play Log Analysis", Computers and Mathematics with Applications, the Netherlands, vol. 65, 2013, pp. 1384-1395.
Ouaddah, et al., "FairAccess: a New Blockchain-based Access Control Framework for the Internet of Things: FairAccess: a New Access Control Framework for IoT," Security and Communication Networks, vol. 9, No. 18, Dec. 2016, pp. 5943-5964.
The European Search Report for European Patent Application No. 19730655.8, dated Sep. 29, 2020, EPO, Munich, Germany.
The European Search Report for European Patent Application No. 19730656.6 dated Dec. 8, 2020, EPO, Munich, Germany.
The European Search Report for European Patent Application No. 19730657.4 dated Dec. 10, 2020, EPO, Munich, Germany.
The European Search Report for European Patent Application No. 19730658.2 dated Sep. 30, 2020, EPO, Munich, Germany.
The International Search Report and the Written Opinion for PCT/US2019/028030, ISA/RU, Moscow, Russia, dated Jul. 23, 2019.

* cited by examiner

BLOCKCHAIN-BASED ADMISSION PROCESSES FOR PROTECTED ENTITIES

CROSS REFERENCE TO RELATED APPLICATIONS

This application is a continuation of U.S. Ser. No. 15/994,414 filed May 31, 2018, now allowed, which claims the benefit of U.S. Provisional Application No. 62/663,132 filed on Apr. 26, 2018, the contents of which are hereby incorporated by reference.

TECHNICAL FIELD

This disclosure generally relates to network security technology, and more particularly to admission controls allowing deferential admission to protected entities using blockchains decentralized ledgers.

BACKGROUND

In the related art, conventional admission control solutions are typically third-party services which the access is requested. For example, Facebook® and Google® provide such services using the OAuth protocol for admission control In many enterprises, similar technology is utilized internally to allow access. For example, Windows® Single-Sign-On (SSO) based on a NT LAN Manager (NTLM) and Kerberos is used as centralized admission service for clients, servers, and applications. Typically, an admission service may consider many parameters in making an admission decision. For example, a role-based access control (RBAC) which is a method of regulating access to computer or network resources based on the roles of individual users within an enterprise. The admission decision is typically an allow-or-deny property.

That is, an admission service considers the available parameters and only the final decision is exposed to the protected entity, if the parameters satisfying a role in the form of a secure admission token (e.g., certificate or a session key). This allow-or-deny binary property of admission control system was historically sufficient as it was assumed that all clients are coming from a relatively trusted environment. In the emerging, predominantly cloud driven, landscape a solution that can provide granular admission after evaluating the risk associated with the access request is clearly needed.

In most cases, the admission to a protected entity requires a user to expose private information over networks and sometimes over the Internet (e.g., user name, phone number, login credentials, etc.), thus admission service are vulnerable to privacy breaches.

Some existing admission control systems are based on a trusted third-party service or infrastructure. For example, a Certificate Authority (CA) used in Public Key Infrastructure (PKI) to infer trust between entities.

A replay attack is one security risk caused by the vulnerability of admission controllers and authentication technologies. In a replay attacks, a third-party adversary listens to the communication between an admission controller and a client (or an admission service) and "replay" the captured communication to gain un-rightful admission. Addressing this risk is in the heart of most admission control systems and protocols. Typically, the communication between the admission controller, the client (or service) is performed over protected interactive sessions. The interactive nature of existing solutions imposes many limitations in system architecture, scale and system availability, thereby leading to costly and inflexible solutions.

In many cases, an admission request is originated from a malicious entity such as a Bot. Addressing the bot risk is also many times in the problem domain of admission systems. However, most admission systems can not address this risk internally, thus relying on external third-party solutions. This further increases the admission control complexity and inflexibility.

Blockchain is a technology that allows for fast, secure and transparent peer-to-peer transfer of digital goods (e.g., money and intellectual property) built over a combination of proven technologies applied in a new way. Specifically, the fundamentals of blockchain are based on the Internet, a private key cryptography, a consensus algorithm and a protocol governing incentivization.

The blockchain provides a system for digital interactions that provides transparency for transactions and does not require a trusted third party. The infrastructure of the blockchain can be viewed as a decentralized immutable database, protected by advanced cryptography, and residing in a plurality of nodes in a large network.

The decentralized immutable database is a distributed ledger that is held and updated independently by each node. The distribution is unique as records are not communicated to various nodes by a central authority, but are instead independently constructed and held by every node. That is, every single node on the network processes every transaction, resulting in self-conclusions, and then votes on those conclusions to ensure that the majority agree with the conclusions. Once there is consensus, the distributed ledger is updated, and each node maintains its own identical copy of the same ledger.

A prime use for blockchain technologies is in virtual currencies or cryptocurrencies, such as Bitcoin, Ethereum, and Litecoin. In Bitcoin, for example, each time a transaction takes place, such as one party sending bitcoin directly to another, the transaction's details (e.g., source, destination and date/timestamp) are added to what is referred to as a block. For example, the block contains the transaction with other similar types of recently submitted transactions. Then, the validity of the transactions within the cryptographically-protected block is checked and confirmed by the collective computing power of nodes (miners) in the network. A consensus reaching technology and game theory based loose/gain procedure is used to make sure all nodes have the same information, the nodes (or minters) are for example computers configured to utilize their processing power to solve complex mathematical problems, such as complex hashing algorithms until a consensus is reached. Once solved, the block and all of its respective transactions are verified as legitimate. When the transactions within a block are deemed legitimate, the block is attached to the most recently verified block in the chain, creating a sequential ledger which is viewable by all who desire.

This process continues in perpetuity, expanding upon the blockchain's contents and providing a public record that can be trusted. In addition to being constantly updated, the chain and all of its blocks are distributed across to all other nodes in the networks. This ensures that the latest version of this decentralized ledger exists virtually everywhere, making it almost impossible to forge.

Most blockchain-based applications involve related monetary transactions of virtual currencies. However, as blockchain technology advances, other blockchain-based applications and uses are proposed. Such applications include establishing digital identity without exposing vulnerable personal information of users, recording smart legal contracts, auditing financial transactions, and automating regulatory compliance.

Cyber-security solutions related to blockchains, discussed in the related art, are mainly directed at securing the transactions or infrastructure of the blockchain (e.g., the distributed ledger, etc.). There are no available solutions for securing entities (e.g., servers, datacenters, and the like) outside of the blockchain infrastructure using blockchain-based technologies. For example, there is no blockchain-based solution that can identify if an access request to a web server is received from a legitimate user or a malicious bot.

Therefore, it would be advantageous to provide an efficient solution that would cure the deficiencies of existing security admission solutions while benefiting from Blockchain advantages.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for controlling access to a protected entity. The method comprises receiving a redirected client request to access the protected entity that was denied by the protected entity; granting, in response to the received redirected request, access tokens of a first type to a client; identifying a conversion transaction identifying a request to convert the first type of access tokens with access tokens of a second type, wherein the transaction designates at least the protected entity; determining a conversion value for converting the first type of access tokens into the second type of access tokens, wherein the conversion value is determined based on at least one access parameter; converting, based on the determined conversion value, a first sum of the first type of access tokens into a second sum of the second type of access tokens; and granting the client access to the protected entity when the sum of the second type of access tokens is received as a payment from the protected entity.

Certain embodiments disclosed herein also include an access system for controlling access to a protected entity. The system comprises a processing circuitry; and a memory, the memory containing instructions that when, executed by the processing circuitry, configure the access system to: receive a redirected client request to access the protected entity that was denied by the protected entity; grant, in response to the received redirected request, access tokens of a first type to a client; identify a conversion transaction identifying a conversion of the first type of access tokens with access tokens of a second type, wherein the transaction designates at least the protected entity; determine a conversion value for converting the first type of access tokens into the second type of access tokens, wherein the conversion value is determined based on at least one access parameter; convert, based on the determined conversion value, a first sum of the first type of access tokens into a second sum of the second type of access tokens; and grant the client access to the protected entity when the sum of the second type of access tokens is received as a payment from the protected entity.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, techniques for allowing blockchain-based admission to protected entities are provided. An admission (or access) to a protected entity is given to a client after granting a number of one or more access tokens in the blockchain. The "spending" of such tokens is also performed via the blockchain network. In an embodiment, the access tokens and, hence, the admission to access to a protected entity, are based on a non-linear model where there is a weight or "cost" is associated with each admission request. This is different than a traditional admission model implemented by existing cyber security systems and admission-services, such as a role-based access control (RBAC), where the admission is binary upon satisfying an access rule. In contrast, according to the disclosed embodiments, the admission is weighted based on one or more access parameters set to weight the risk of false positive detection of an attacker admission with the risk of false negative detection of a legitimate user denial of admission. Furthermore, according to the disclosed embodiments, the admission may optionally comprise a plurality of weighted parameters indicating the risk associated in multiple dimensions such as, but not restricted to, risk in reading, risk in modifying, risk in sharing, on so on. Accordingly, the disclosed embodiments provide for increased temporal-accuracy access token verifications and, thus, more secure admission, than existing admission solutions. The disclose embodiments also allow for detecting and mitigating the risk associated with Bots. The various disclosed embodiments will now be disclosed in greater detail.

Figure 1:
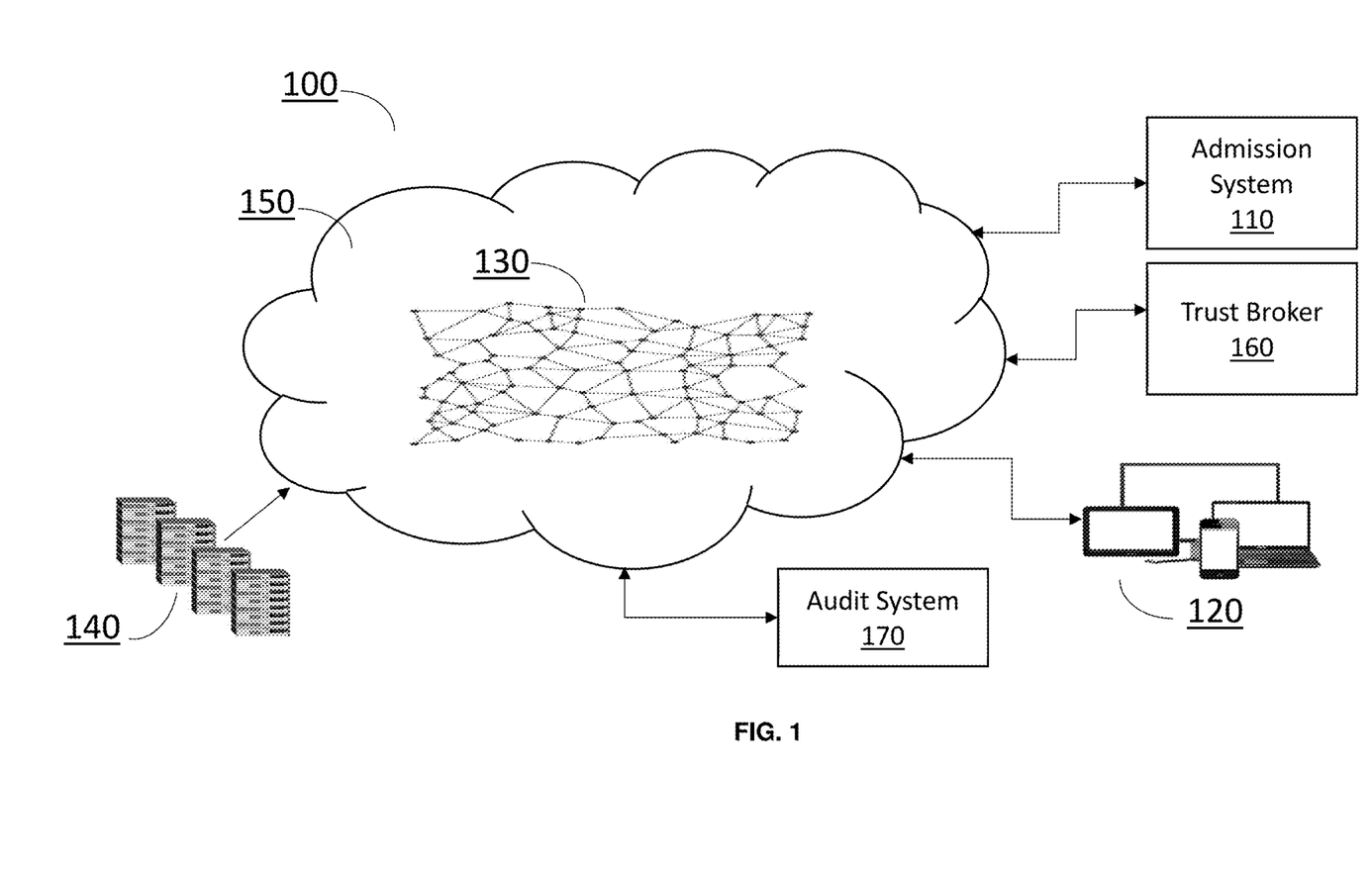
FIG. 1 is a network diagram utilized to describe the various disclosed embodiments.

FIG. 1 shows an example network diagram 100 utilized to describe the various disclosed embodiments. The network diagram 100 illustrated in FIG. 1 includes an admission system 110, a client 120, a blockchain peer-to-peer network 130 (hereinafter referred to as the blockchain network 130, merely for simplicity purposes), and a protected entity 140. The entities in the network diagram 100 communicate via a network 150, reside in the network 150, or both. The admission system 110 controls and regulates admission of the client 120 by issuing to the client 120 access tokens to be consumed by the protected entity 140 as will be discussed in detail below. In certain implementations, a trust broker 160 is also connected to the network 150 and communicatively connected to the blockchain network 130. As discussed below, the trust broker 160 is configured to replace one type of access token with another type of access token based, in part, on a non-linear conversion model for example using $e^{-ct}$ as a multiplication factor where 'ct' is driven from the time of last admission.

In an embodiment, the various entities discussed herein, the admission system 110, client 120, protected entity 140, trust broker 160, and audit system 170 act as full peer members in the blockchain network 130 accessing it without intermediaries. In an embodiment, the audit system 170 is integrated in the admission system.

In another embodiment, these entities can all be non-blockchain members. In such configuration, some or all these entities can enlist the services of a third-party crypto-currency wallet service or application to provide access to the blockchain network 130 as well as holding all relevant crypto elements, such as keys. In yet another embodiment, the client 120 and the protected entity 140 may optionally include means for maintaining tokens issued by the admission system 110 or utilized the cryptocurrency wallet described herein.

The network 150 may be, but is not limited to, a local area network, a wide area network, the Internet, one or more data centers, a cloud computing infrastructure, a cellular network, a metropolitan area network (MAN), or any combination thereof. The admission system 110, the protect entity 140, or both, can be hosted in a cloud computing platform, such as, but not limited to, a private cloud, a public cloud, a hybrid cloud, or any combination thereof. The client 120 may be a PC, a mobile phone, a smart phone, a tablet computer, a server, and the like. The client 120 may be operated by a legitimate user, a program or may be an attack tool.

The protected entity 140 is the entity to be protected from malicious threats. The protected entity 140 may be any network or computing element including resources that can be accessed by the client 120. For example, the protected entity 140 may be a function in a serverless architecture, an application server, a web server, a cloud application, a datacenter, a network device (e.g., a router, an ADC, etc.), a firewall (e.g., a web-application firewall), and so on.

In certain implementations, the network diagram 100 further includes an audit system 170 utilized to record or log any transactions performed between two or more of the admission system 110, the client 120, the trust broker 160, the protected entity 140. For example, the audit system 170 is configured to record whether an admission request is accepted or not, the conversion value set for different types of access tokens, a number of admission requests requested by the client 120, and so on. In another embodiment, the function of logging transactions by the audit system 170 is performed on the blockchain network 130, i.e., by its distributed ledger.

According to an embodiment, the admission system 110 may be communicatively connected with the protected entity 140, where both the admission system 110 and the protected entity 140 are peers in a blockchain peer-to-peer (P2P) network and may act as a proxy to the P2P network. For example, translating from HTTPS messages to message that can be transported on the P2P network. The admission system 110 and the protected entity 140 may be configured each or both to receive or otherwise intercept requests (such as, but not limited to, HTTP/HTTPS requests) generated by the client 120. The requests are directed using the device proxy function or using the native protocol redirect functions to the admission system 110. The secured datacenter can be operable in a cloud-computing infrastructure, a hosting server datacenter, service provider networks, or a cooperative network.

It should be noted that, although one client 120 and one protected entity 140 are illustrated in FIG. 1 merely for the sake of simplicity, the embodiments disclosed herein can be applied to a plurality of clients, a plurality of protected entities, or both. Further, a plurality of admission systems can be utilized, or the admission system 110 may be configured in a distributed implementation. The clients may be located in different geographical locations. Furthermore, a single client 120 may be served by a plurality of admission servers 110 concurrently.

It should be further noted that in certain embodiments, the admission system 110 and the trust broker 160 may be implemented in a single system or as a distributed system. Further, each element discussed above can also be integrated in a single system for example the admission system 110 and protected entity 140 implemented as a single unified gateway.

In another embodiment, the admission system 110, the trust broker 160, and/or the protected entity 140 can be implemented in a network device already deployed in the network 150. Example for such a network device includes an application delivery controller (ADC), load balancer, a web application firewall (WAF), a router, a firewall, and the like.

The blockchain network 130 is a collection of nodes (not labeled) utilized to maintain a distributed ledger and verified blocks, as discussed above. A node may be a physical machine, or a virtual machine executed by a machine having a sufficient computing power to verify a block. In an embodiment, the nodes of the blockchain network 130 may be configured to handle proprietary tokens (e.g., verified block of transactions for converting proprietary tokens). The proprietary tokens may be of different types.

In another embodiment, the nodes of the blockchain network 130 may be configured to handle tokens of standard virtual currencies such as, but not limited to, Bitcoin, Ethereum, Litecoin, and the like. For example, the infrastructure to the Ethereum blockchain network is based on a collection of nodes realized as Ethereum Virtual Machines (EVM) connected in a mesh connection. Each such node runs a copy of the entire blockchain and competes to mine the next block or validate a transaction. Further, each node in the blockchain network 130, implemented as Ethereum, maintains an updated copy of the entire Ethereum blockchain. In an embodiment, the blockchain network 130 can be configured as a private network. In this embodiment, tokens (or contracts) accessible to nodes that are connected to a private network, e.g., the blockchain network 130, operate in a private mode. In yet another embodiment, a private token is utilized as part of a public or private Ethereum blockchain.

In another embodiment, the admission system 110 and the protected entity 140 participate in a smart contract using the crypto EVM capabilities to grant and track admission of the client to the client 120. A smart contract is a computer protocol intended to digitally facilitate, verify, or enforce the negotiation or performance of a contract defined as collection of executable computer code in one of many possible computer languages such as but not limited to "Python", "Java", "R", "Solidity" or any other computer languages used now or in the future to implement blockchain based smart contracts. Smart contracts allow the performance of credible transactions without the existence of trusted third parties. These transactions are tractable and irreversible.

In an embodiment, the smart contract is generated ("written") by the admission system 110. The admission system 110 may determine the pre-conditions or conditions for the smart contract. Such conditions may be determined based on, for example, the client 120, protected entity 140, logged history, and so on. The smart contract, although being fulfilled by, for example, the EVM (network 130) the contract generated by the system 110 is independent of the network.

In should be noted that other embodiments utilizing other forms of consensus-based technologies can be used to implement the admission system 110. For example, a Byzantine Fault Tolerance algorithm can be used for control and reach consensus over the Linux Foundation hyper-ledger implementation, over Corda, and the like.

It should be appreciated that, in some embodiments, utilizing the blockchain network 130 for the admission process allows maintaining privacy of the user accessing the protected entity 140 while providing transparency of admission transactions. Further, the blockchain network 130 can be easily scaled, therefore providing a scalable solution.

In the example implementations described with respect to FIG. 1, the admission to the protected entity 140 is delegated to and regulated by the admission system 110 and is based, in part, on access tokens provided by the admission system 110. The access tokens may be of the same type or of different types. Further, the tokens may be proprietary tokens or may be based on standard virtual currencies or contracts, such as those described above.

According to the disclosed embodiments, various blockchain-based admission processes can be implemented by the admission system 110. In an embodiment, the admission system 110 provides access tokens to the client 120, upon receiving a request to grant such tokens. The access tokens are granted through the blockchain network 130. In other words, the granting of the access tokens is recorded as a transaction included in a block of a blockchain maintained by the blockchain network 130. Upon requesting an access to the protected entity 140 by the client 120, the client 120 "pays" the protected entity 140 the access tokens.

This may be performed by revoking (spending) the access tokens granted to the client 120 in order to gain access. In other words, the use of the access tokens is recorded as a transaction and included in a block of the blockchain maintained by the blockchain network 130. Thus, the validation of the transaction (access request) is performed through the blockchain network 130. In an embodiment, the validation can be performed prior to admitting an access to the protected entity 140. In yet another embodiment, the validation is performed after an admission is conditionally granted to the client. If the validation fails, the client 120 is disconnected from the protected entity 140.

In an embodiment, the access tokens can be granted by the admission system 110 after the client 120 performs computing challenges. An example for such challenges may include a requirement to solve a mathematical function. As such, the client 120 is required to invest computing resources to solve the function. For legitimate users it would be a one-time challenge, but for attackers (bots) generating thousands of requests it would drain their computing resources.

In exemplary embodiment the complexity of the admission system 110 issued challenges to client 120 can be controlled by the admission system 110 dynamically. The admission system 110 may increase or decreases the challenge complexity according to one or more access parameters, discussed herein.

In an embodiment, the admission system 110 is configured to protect a plurality of protected entities 140 the dynamic challenge cost can be controlled by referencing the combined activity of the client 120 accessing multiple protected entities. This allows the admission system 110 to act as an anti-bot service.

As the challenge complexity increases, an embodiment can set thresholds on one or more access parameters and use the designated threshold to identify a bot threat. Once a bot threat has been identified an embodiment can change the dynamic challenge strategy and set a new challenge strategy, for example, setting an exponential growth challenge complexity so the risk can be slowed down quickly.

According to another embodiment, a specific cost is associated with accessing the protected entity 140. For example, various services provided by the entity 140 would require different numbers of access tokens. That is, the cost, in this embodiment, is defined by the number and type of access tokens. The cost for accessing may be maintained in a centralized location, by the admission system 110, or by the protected entity 140 or in any combination thereof. The client 120 is configured to check the admission cost for accessing the protected entity 140. If the client 120 does not possess enough access tokens (as recorded in the blockchain), the client 120 requests the admission system 110 for additional access tokens. The request may designate any combination of a number of access tokens and their types. To access the protected entity 140, the access tokens are provided through the blockchain network 130.

In another embodiment, the admission cost is dynamically weighted and two or more different types of access tokens are utilized. In this embodiment, to access the protected entity 140, the client 120 first acquires a number of first-type access tokens from the admission system 110. The protected entity 140 also requires a number of second-type access tokens. Thus, the client 120 is configured to convert the first-type access tokens for the second-type access tokens using the trust broker service 160. The conversion value can be dynamically determined, e.g., per access request based on one or more parameters. Such parameters may be related to the client 120, the protected entity 140, global indications, or a combination thereof. For example, the reputation, geographical location, or historical record as supplied by the blockchain 130 network or the audit system 170 and rate of access tokens spending may be parameters related to the client 120. A service being accessed, and a current load may be parameters related to the protected entity 140. An indication for an external source (not shown) an on-going attack campaign or the state of the internal anti-bot function may be an indication for an ongoing attack.

The admission system 110 may issue more than one type of access tokens in a single transaction to the client 120. In an embodiment, a transaction issued may include a number of cryptocurrency tokens as well as an SSL certificate issued to the client 120, the SSL certificate is generated by a certificate issuer (not drawn) and may include the client 120 identity information, if such information was supplied as well as the client 120 public key. The certificate may have a revocation date that was influenced by the admission controller 110 one or more access parameters.

The issued certificate can be used to establish a legacy secure service that does not have blockchain access for example an existing VPN, web or email solution The various embodiments for admission controls will be discussed in further detail with reference to FIGS. 2-4.

Figure 2:
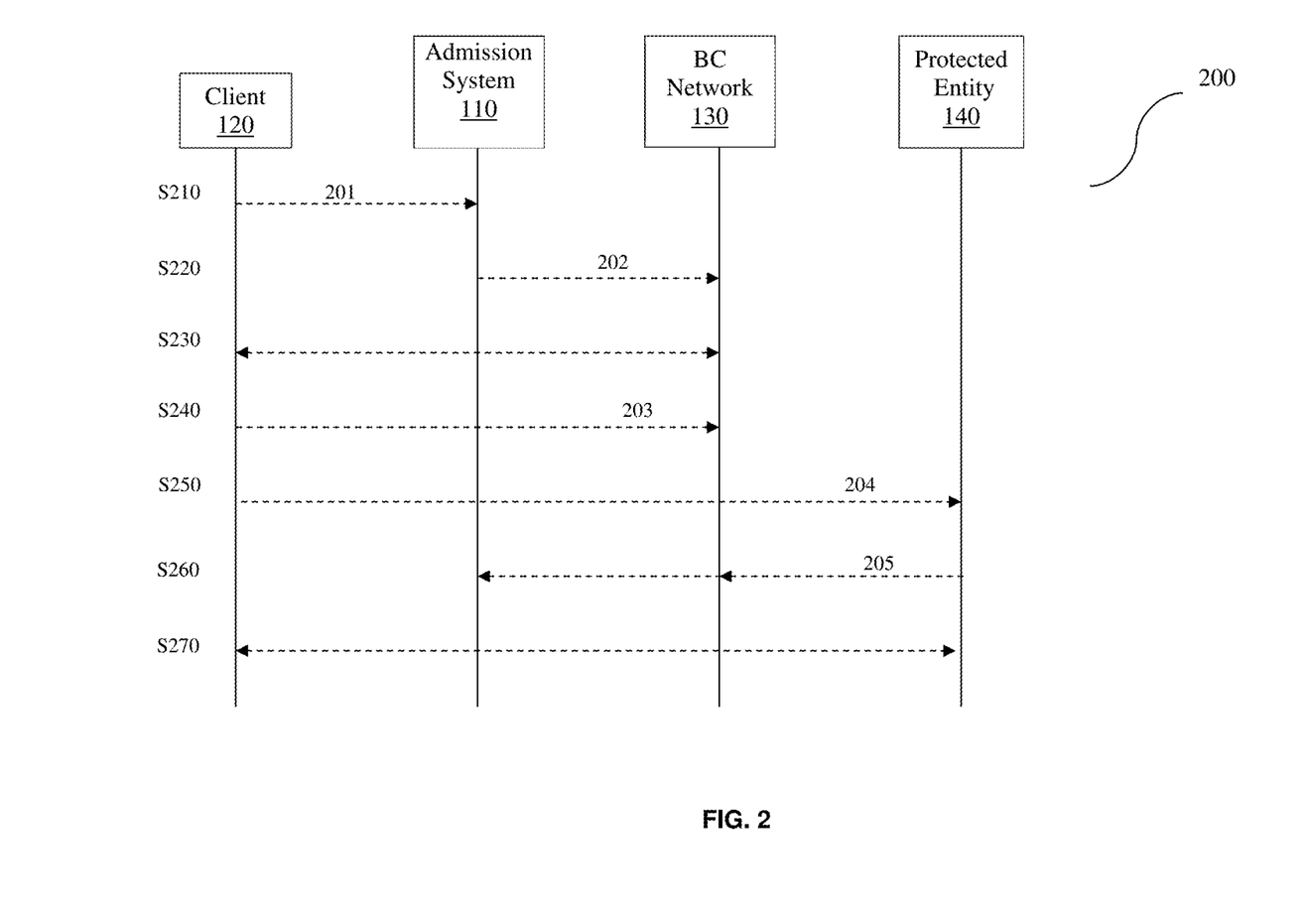
FIG. 2 is a flow diagram illustrating a non-weighted blockchain-based admission process according to an embodiment.

FIG. 2 is an example flow diagram 200 illustrating a non-weighted blockchain-based admission process according to an embodiment. The elements illustrated in FIG. 2 including the admission system 110, the client 120, the blockchain network 130, and the protected entity 140, are described herein above with reference to FIG. 1.

At S210, the client 120 sends a request (201) to grant ("buy") access tokens from the admission system 110. The access tokens may be used to access the protected entity 140. In some embodiments, the request (201) is sent only after the client 120 successfully completes a challenge selected and set by the admission system 110. The challenge process is discussed in greater detail with reference to FIG. 7.

The request (201) may include a public key of the client 120 and may further designate the entity to be accessed. The request (201) sent from the client 120 does not need to include any identifying information of a user of the client 120. The request (201) may be sent using a standard layer-7 protocol, such as HTTP or HTTPS. In yet another embodiment, the request (201) may be sent via the blockchain network 130 as a non-interactive payment of the admission service. The admission system 110 may implement various known and unknown procedures such as, but not limited to, client certificates, one-time pads (OTPs), and so on, to identify, qualify, validate, check balances or historical record locations, or a combination thereof, of the client 120. When keeping the privacy of the client 120 is mandatory, argument of knowledge such as SK-SNAKS and Zcach can be used instead of exposing the client identity directly.

In some embodiments, the request (201) may be trigged after the client 120 failed to directly access the protected object 140. In such case, the protected object 140 may redirect a request from the client 120 to the admission system 110.

At S220, upon identifying, validating, and approving the client's 120 request for admission, the admission system 110 is configured to grant (202) a number of access tokens to the client 120. The access tokens are granted (e.g., paid) to the client 120 through the blockchain network 130 using the public key of the client 120. In yet another embodiment, when the access tokens are implemented using zero-knowledge arguments of proof cryptography, such as ZK-SNARKs used in Zcash the public key of the client 120 may not be required.

It should be noted that in some configurations, when the client 120 successfully passed a challenge set by the admission system 110, S210 and S220 can be skipped, as the access tokens are granted as the client 120 passes the challenge.

At S230, the client 120 is configured to identify, on the blockchain network 130, the transaction ID holding the access tokens granted to the client 120.

At S240, the client 120 is configured to add a transaction (203) to the blockchain network 130. The transaction (203) includes transaction data, a transaction hash value, and a hash value of a previous transaction(s). In an embodiment, the transaction may also include an arbitrary number of metadata elements as specified and requested by the admission system 110, the client 120 or the protected object 140. In an example embodiment, the transaction data may include a unique transaction ID, a number of access tokens to pay for access, an identification of the admission system 110 as the source granting the access tokens, and a target service, application, or resource at the protected entity 140 that the client 120 requests access to. It is not mandatory for the transaction (203) to include any information identifying the client 120 or a user using the client 120. A hash of transaction is cryptographic hash of the transaction's content. The owner of the transaction, e.g., the admission system 204 sign the transaction with its private key or other cryptographic identities. The transaction can be verified using a public key of the transaction owner.

At S250, the client 120 sends an access request (204) to the protected entity 140 to access a service or resource. For example, the access request (204) may be to login to a user account, perform an action (e.g., download a file), access a secured resource, and so on. The request (204) may be sent using a standard layer-7 protocol, such as HTTP or HTTPS. The access request (204) can include the transaction ID of the transaction (203) to ease the protect entity 140 to look up for the transaction, the protected entity 140 may search for a relevant transaction in case that such transaction ID is not provided.

It should be noted that any access request sent from the client 120 to the protected entity 140 remains pending until admission by the protected entity 140. The access requests may be iteratively sent, until access is granted. It should be further noted that the validation of the transaction (access request) is performed through the blockchain network 130. As noted above, the validation can be performed prior to admitting an access to the protected entity 140. Alternatively, the validation is performed after an admission is conditionally granted to the client. If the validation fails, the client 120 is disconnected from the protected entity 140. In addition, the audit system 170 may log any failure to successfully complete a challenge to at least determine the determine trust of access value for the client, as discussed in detail below.

At S260, the protected entity 140 is configured to validate the transaction (203) through the blockchain network 130. In an embodiment, such validation is performed by immediately spending the access tokens designated in the transaction (203) as payment to the admission system 110. As a result, the transaction (203) is marked as "spent" in a respective block maintained in the blockchain network 130 and cannot be referenced by again by the client. It should be noted that transactions are never deleted from blocks maintained in the network 130.

At S270, once the transaction is validated and access tokens are paid, access is granted to the client 120 to access the target resource or service at the protected entity 140. In an embodiment, the protected entity 140 may use the number and type of access token paid to set temporal ACL on the accessing the client 120. That is, the access may be limited in time based on the number and type of access tokens being paid.

It should be noted that the access tokens are typically paid to the admission system 110 upon fulfillment of the access request (204). A fulfillment of the access request (204) may include allowing the client 120 to access the protected object 140, conditionally allowing the client 120 access the protected object 140, or denying an access to the protected object 140.

It should be further noted that each transaction (203) is a transfer of a certain value of access tokens between the client 120, the system 110, and the entity 140. The blockchain block signature also prevents the transaction from being altered once it has been issued. Although not illustrated in FIG. 2, all transactions are broadcast between nodes of the blockchain network 130 and validated through a mining process.

It should be further noted that, to grant the access tokens, the admission system 110 and the client 120 may exchange their public keys. In order to revoke the access tokens, the system 110 and protected entity 140 may exchange their public keys. That is, there is no direct transaction with respect to the utilization of the access tokens between the client 120 and the protected entity 140. A key (private or public) may be a cryptography key. Alternatively or collectively, the protected entity 140 and admission system 110 may employ other means of secure communication, such as pre-shared keys. Furthermore, the admission system 110, the client 120, and the protected entity 140 may be acting under a public key infrastructure (PKI) or certificate authority (CA) mechanism.

As an example, an access token may be a chain of digital signatures. The system 110 may transfer the access token to the client by digitally signing a hash of the previous transaction and the public key of the protected entity 140. The signatures (hash values) may be appended to each access token. To grant an access to the client 120, the entity can validate the signatures to verify the chain of ownership.

Figure 3:
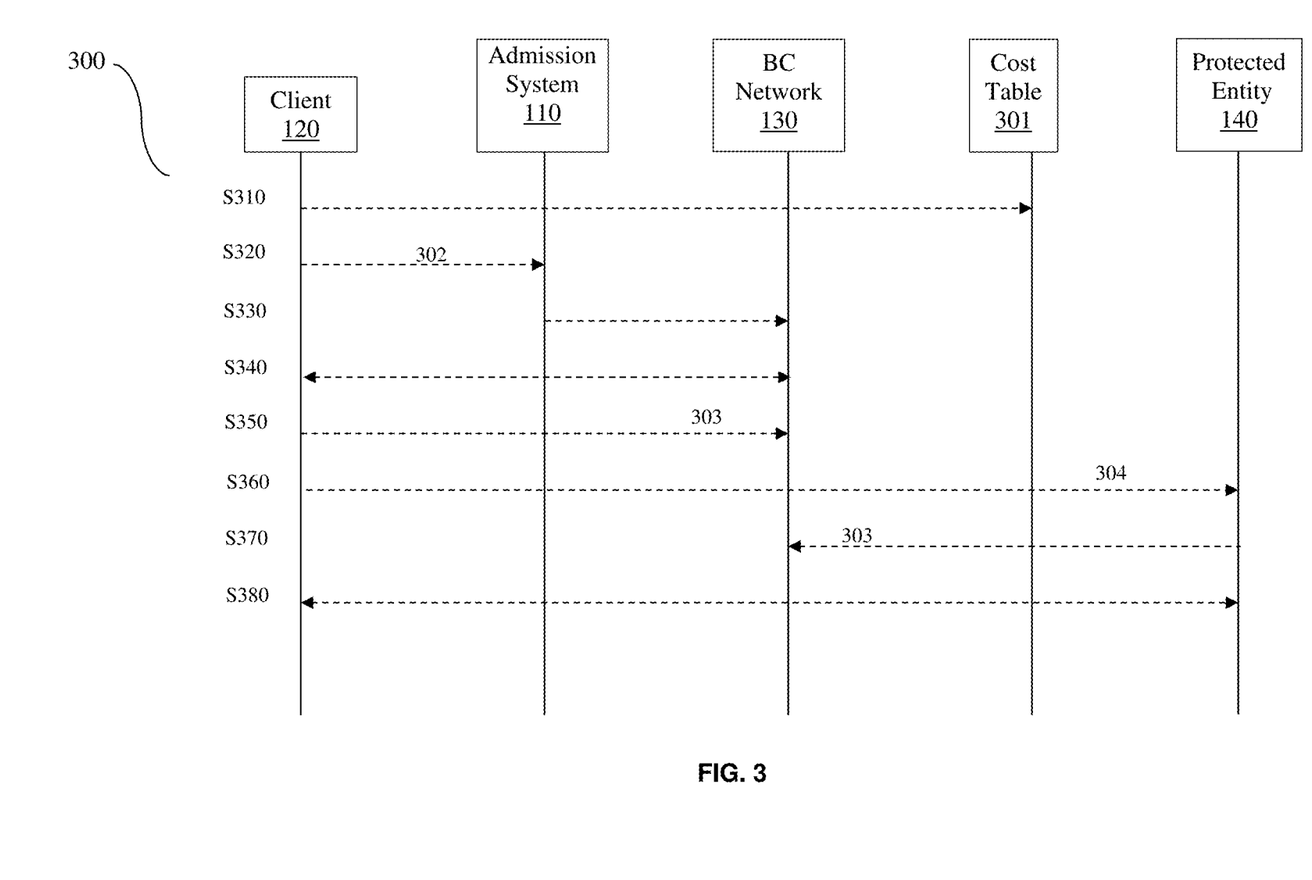
FIG. 3 is a flow diagram illustrating a cost-based and blockchain-based admission process according to an embodiment.

FIG. 3 shows an example flow diagram 300 illustrating a cost-based admission process according to another embodiment. The elements illustrated in FIG. 3 including the admission system 110, the client 120, the blockchain network 130, and the protected entity 140, are described herein above with reference to FIG. 1.

In this embodiment, there is a dynamic admission cost to access the protected entity 140. The cost is defined by a number of access tokens that may be set based on a target service, application, or resource at the protected entity 140 from which an access is required; the behavior of the client 120; or both. The cost is maintained in a cost table 301. In an embodiment, the cost table 301 may be managed and reside in the admission system 110. Alternatively, the cost table 301 may be managed by an admission system 110, but saved in the centralized repository (not shown). This would allow the admission system 110, the protected entity 140, or another arbitrator (not shown) to control the admission costs across different protected entities, across different clients, or both.

In yet another embodiment, the cost table 301 is saved in the protected entity 140 including the admission cost to access its services or resources. The cost table 301 may be managed by the protected entity 140 or the admission system 110.

In yet another embodiment, the cost table 301 may be maintained in the blockchain network 130 as distributed records in the distributed ledger. This would allow for consistent maintenance of cost values. In such an embodiment, the cost table 301 may be managed by the admission system 110 or the protected entity 140.

It should be noted that the cost table 301 discussed herein below refers to all of the different embodiments utilizing cost tables as described herein.

At S310, the client 120 is configured to inquire about the admission cost (i.e., the number of access tokens) required for accessing a specific service or resource at the protected entity 140. The inquiry is to the cost table 301.

At S320, if the client 120 does not have sufficient access token value in its wallet, the client 120 sends a request (302) to grant access tokens from the admission system 110. The access tokens may be used to access the protected entity 140. As noted below, the admission system 110 may implement different business flows to identify, qualify, or validate the client 120, or a combination thereof. In some embodiments, the request (302) is sent only after the client 120 successfully completes a challenge selected and set by the admission system 110. The challenge process is discussed in greater detail with reference to FIG. 7.

At S330, upon identifying, qualifying, or validating, and approving the client's 120 request for admission, the admission system 110 is configured to grant (202) a number of access tokens to the client 120. The access tokens are granted (e.g., paid) to the client 120 through the blockchain network 130 using the public key of the admission system 110. The number of granted access tokens should be enough to satisfy the admission cost designated in the cost table 301. It should be noted that if the client 120 already has enough tokens (e.g., as verified via the blockchain network 130), or the client 120 successfully passes the challenge S320 and S330 are not performed.

At S340, the client 120 identifies, on the blockchain network 130, the transaction ID holding the access tokens granted to the client 120. The identified tokens may be stored in a cryptocurrency wallet included in the client 120.

At S350, the client 120 is configured to add a transaction (303) to the blockchain maintained by the blockchain network 130. The transaction (303) includes transaction data, a transaction hash value, and a hash value of a previous transaction(s). In an example embodiment, the transaction data may include a number of access tokens to pay for access, an identification of admission system 110 as the source granting the access tokens, and a target service, application or resource at the protected entity 140 that the client 120 requests to access. The transaction (303) does not include any information identifying the client 120 or its user. In an embodiment, the transaction may also include an arbitrary number of metadata elements as specified and requested by the admission system 110, the client 120 or the protected object 140.

At S360, the client 120 is configured to send an access request (304) to the protected entity 140. The access request (304) includes the transaction ID of the transaction added to the blockchain. As mentioned above, the access request (304) can include the transaction ID of the transaction (303) to ease the protected entity 140 to look up for the transaction, the protected entity 140 may search for a relevant transaction in case that such transaction ID is not provided. As further noted above, any access request sent from the client 120 to the protected entity 140 is pending admission by the protected entity 140.

At S370, the protected entity 140 is configured to validate the transaction (303) through the blockchain network 130. As noted above, such validation is performed by immediately spending the access tokens designated in the transaction (304) as payment to the admission system 110. As a result, the transaction (304) is removed from a respective block maintained in the blockchain network 130 and cannot be referenced again by the client 120.

At S380, once the transaction is validated and tokens are paid, access is granted to the client 120 to access the target resource or service at the protected entity 140. As noted above, the protected entity 140 may use the number and type of access token paid to set a temporary ACL on the accessing the client 120. That is, the access may be limited in time based on the number and type of access tokens being paid.

In some embodiments, S380 may further include updating the cost table 301, e.g., increasing or decreasing the cost associated with accessing the protected entity 140. The cost may be updated based on of the parameters discussed herein above by the entity managing the cost table 301 (e.g., the admission system 110, the protected entity 140, etc.)

As mentioned above, each transaction (e.g., a transaction 304) is a transfer of a certain value of access tokens between the client 120, the admission system 110, and the protected entity 140, each of which may maintain a cryptocurrency wallet. Further, to grant the access tokens, the admission system 110 and the client 120 may exchange their public keys. In order to revoke the access tokens, the admission system 110 and the protected entity 140 may exchange their public keys. That is, there is no direct transaction with respect to the utilization of the access tokens between the client 120 and the protected entity 140. A key (private or public) is a cryptographic key.

Figure 4:
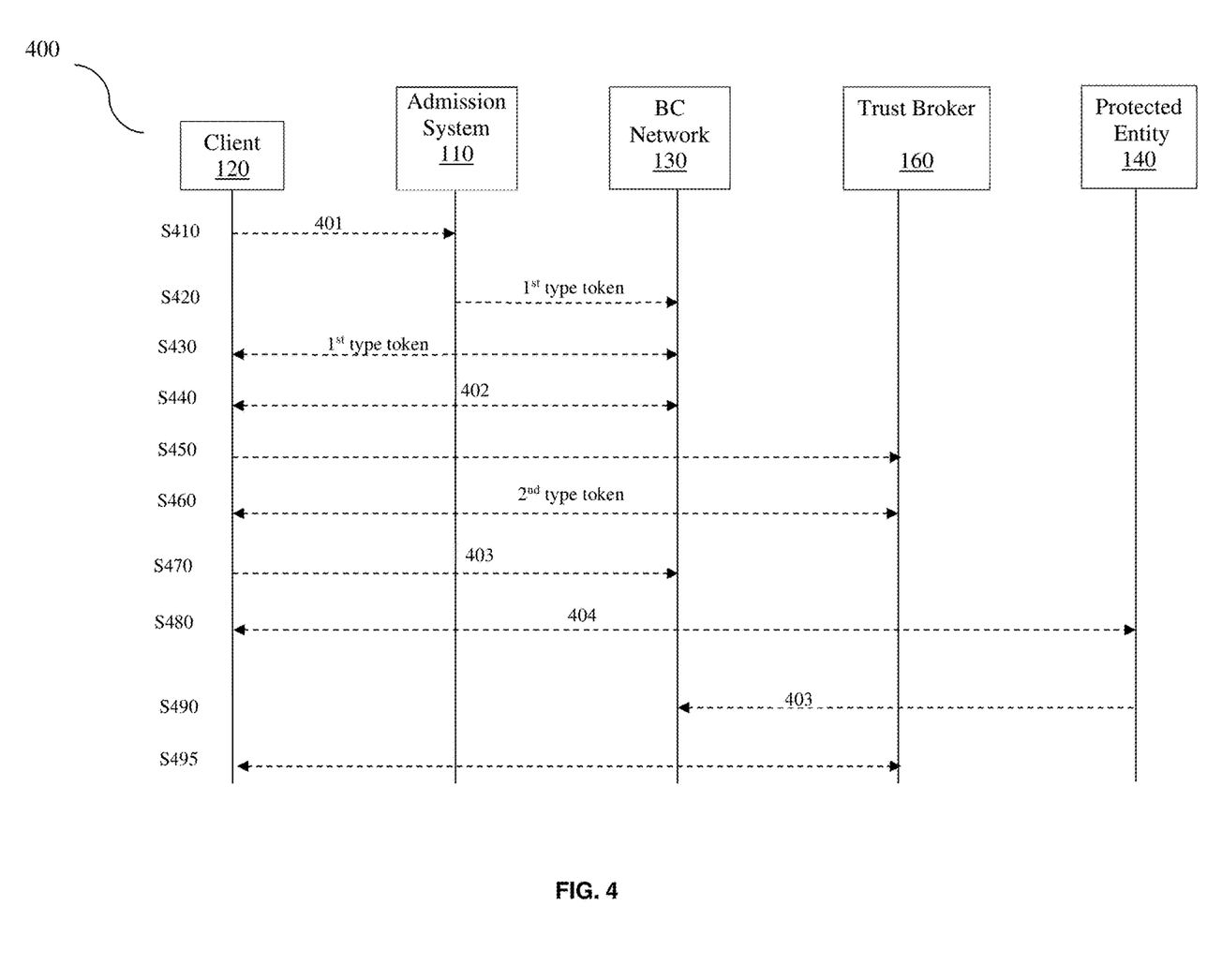
FIG. 4 is a flow diagram illustrating a weighted blockchain-based admission process according to an embodiment.

FIG. 4 shows an example flow diagram 400 illustrating a weighted blockchain-based admission process according to an embodiment. The elements illustrated in FIG. 4 including the admission system 110, the client 120, the blockchain network 130, the protected entity 140, and the trust broker 160 are described herein above with reference to FIG. 1.

In this embodiment, two types of access tokens are used, where a conversion value is dynamically determined for converting the first-type to the second-type of the access tokens. For example, the conversion value may be determined per access request, per conversion-token transaction, per session, or a combination thereof. In essence, the conversion value determines the admission cost, but in this embodiment, such cost is dynamically updated based on a plurality of access parameters. Further, there is no need to maintain any data structure (e.g., the cost table 301, FIG. 3). In an embodiment, the conversion value is determined by the trust broker 160.

The weighted admission process weights the risk of false positive detection of attacker admission against the risk of false negative detection of legitimate user denial of admission. The weighted admission process allows a defender to scale a cost to access a protected entity linearly with the attack, while exponentially increasing the admission cost as, for example, the volume of the attack, type of attack, and other risk factors associated with the attack.

To this end, the conversion value is dynamically determined based on one or more access parameters, the interaction between the access parameters, or both. A first group of access parameters are related to the client 120. A reputation of the client 120, determined by the system 110 or received from an external service, can be utilized to determine the conversion value. That is, a bad reputation would lead to a higher conversion value, and vice versa. The geographical location of the client 120 can determine the conversion value. For example, a client 120 from a "reputable" country (e.g., USA) would positively affect the conversion value. A behavior of the client 120 can also determine the conversion value. The admission system 110, the trust broker 160, or both, may monitor the activity of the client 120 across multiple protected entities, non-protected entities, or both, to detect any suspicious activity and determine the conversion value respective thereof. For example, a client that frequently requests additional access tokens may be classified as suspicious (e.g., a bot), which would lead to a higher conversion value. As another example, a client 120 that does not perform any malicious activity may be classified as legitimate, which would lead to a lower conversion value.

The conversion value can be determined over multiple access tokens representing different granular admission rights. For example, read-access-tokens indicting the client 120 admission may incur lower cost than write-access-tokens indicting the client permissions to edit data and incur higher cost therefor controlling the client temporal authorization in fine granularity over multiple dimensions as dictated by risk analysis and the protected entity admission granularity.

A second group of access parameters are related to the protected entity 140. For example, a sensitive resource or service of the protected entity 140 would require a higher conversion value, regardless of the trustworthiness of the client 120. As another example, the current load on the protected entity 140 may affect the conversion value, i.e., the higher the load the higher the conversion value is.

In an embodiment, a network load balancer or and ADC (not shown) deployed in network 150 anywhere in the path of client 120 or protected entity 140 can be used to provide load and utilization data as such external data.

A third group of access parameters are global indications. An indication of an-going cyber-attack against the protected entity or other entities in the network is considered as a global parameter. A volume of an on-going attack is also considered as a global parameter. Such indications may be received from external systems (not shown) connected to the admission system 110, the trust broker 160, or both. For example, an indication of an on-going cyber-attack would lead to a higher conversion value. Other examples for global parameters may include time of the day, certain day (weekends, weekdays, or holidays), and the like.

In all of the above example access parameters, the weight (i.e., conversion value) can be adapted as a non-linear function. The non-linear function does not impact legitimate users that occasionally access the protected entity 140, but such a function significantly impacts attackers frequently accessing the protected entity 140. Thus, using the access parameters to determine the conversion value allows to "discriminate" among clients, while the clients can maintain their privacy. The mentioned above example access parameters may be determined based on historical data logged in the audit system 170. For example, such data may include the identified conversion transaction, determined conversion values, and more.

At S410, the client 120 is configured to send a request (401) for grant (buy) of access tokens from the admission system 110. The access tokens may be used to access the protected entity 140 only after being converted. That is, a first-type of access token is required. In an embodiment, the request (401) includes a public key of the client 120 and may further designate the entity to be accessed. In another embodiment, the first-type of access token is based on zero-knowledge cryptography and does not require a public key. As an example, the access token can be implemented using Zcash technologies.

The request (401) sent from the client 120 does not need to include any identifying information on a user of the client 120. The request (401) may be sent using a standard layer-7 protocol, such as HTTP or HTTPS. The admission system 110 may implement different business flows to identify, qualify, or validate the client 120, or a combination thereof.

As noted above, in some embodiments, the request (401) may be trigged after the client 120 failed to directly access the protected object 140. In such case, the protected object 140 may redirect a request from the client 120 to the admission system 110. In some embodiments, the request (401) is sent only after the client 120 successfully completes a challenge selected and set by the admission system 110. The challenge process is discussed in greater detail with reference to FIG. 7.

At S420, upon identifying, validating, and approving the client's 120 request for admission, the admission system 110 is configured to grant a number of first-type access tokens to the client 120. The access tokens are granted (e.g., paid) to the client 120 through the blockchain network 130 using the public key of the client 120. In yet another embodiment, when the access tokens are implemented using zero-knowledge arguments of proof cryptography, such as ZK-SNARKs used in Zcash, the public key of the client 120 may not be required. When admission system 110 grants the first type access token, the system 110 add metadata in the blockchain network's 130 transaction record.

At S430, the client 120 is configured to identify, on the blockchain network 130, the transaction ID holding the first-type access tokens granted to the client 120. The tokens may be stored in a cryptocurrency wallet included in the client 120.

It should be noted that S410-S430 may not be performed if the client 120 holds enough first-type access tokens, for example, from previous transaction(s).

At S440, the client 120 is configured to add a transaction (402) to the blockchain network 130 to convert the first-type of access tokens with a second-type of access tokens. The transaction (402) includes transaction data, a transaction hash value, and a hash value of a previous transaction(s). In an example embodiment, the transaction data may include a unique transaction ID, a number of available first-type access tokens, an identification of the admission system 110 as the source granting the access tokens, and a target service or resource at the protected entity 140 that the client 120 requests to access. The transaction (402) does not need to include any information identifying the client 120 or a user using the client 120.

At S450, the trust broker 160, is configured to identify the transaction ID of the transaction (402) and determine the conversion value for the transaction (402) based on one or more access parameters. As noted above, such parameters may be related to the client 120, the protected entity 140, or any global indication. It should be noted that in some embodiments, the trust broker 160 may be integrated in the admission system 110. Thus, the admission system 110 may perform the conversion operation. Further, the admission system 110, trust broker 160, or both can be implemented as a distributed system.

In an embodiment, the conversion transaction can be realized as a smart contract written on the Ethereum network EVN or other blockchain network. In another embodiment, the conversion transaction can be realized using off-chain Oracle.

As a result, the admission system 110 is configured to grant a number of second-type access tokens to the client 120 based on the conversion value. Such second-type access tokens are paid to the client 120 through the blockchain network 130 using, for example, a public key of the client 120. In an example implementation, the first and second access-tokens may be different types of cryptography currencies. For example, the first-type token may be a Zcash coin and the second-type token may be Ethereum.

It should be noted that the first-type and second-type of access tokens can be granted during different sessions. That is, the conversion of the first-type and second-type access tokens may not occur immediately after the first-type of access tokens are granted. That is, the client 110 may hold the first-type access tokens in its wallet or as unspent transactions in the ledger and request the conversion only when it is required to access the protected entity. Further, the first-type of access tokens may be a global currency, while the second-type of access token may be specific to certain types of protected entities. That is, various types of "second-types" tokens can be used. It should be further noted that, once the second-type of access tokens are granted to the client, the previous transaction, i.e., the transaction (402), is spent from a block maintained in the blockchain network 130 and cannot be referenced again by the client 120.

At S460, the client 120 is configured to identify, on the blockchain network 130, the transaction ID holding the second-type of access tokens. The tokens may be stored in a cryptocurrency wallet included in the client 120.

At S470, the client 120 is configured to add a new transaction (403) to the blockchain network 130 to convert the first-type access tokens with a second-type access tokens. The transaction (403) includes transaction data, a transaction hash value, and a hash value of a previous transaction(s). In an example embodiment, the transaction data may include a unique transaction ID, a number of available second-type access tokens an identification of admission system 110 as the source granting the access tokens, and a target service or resource at the protected entity 140 that the client 120 requests to access. In an embodiment, the transaction may also include an arbitrary number of metadata elements as specified and requested by the admission system 110, the client 120 or the protected object 140.

At S480, the client 120 is configured to send an access request (404) to the protected entity 140. As mentioned above, the access request (404) can include the transaction ID of the transaction (403) to ease the protected entity 140 to look up for the transaction, the protected entity 140 may search for a relevant transaction in case that such transaction ID is not provided. As further noted above, any access request sent from the client 120 to the protected entity 140 is pending admission by the protected entity 140.

At S490, the protected entity 140 is configured to validate the transaction (403) through the blockchain network 130. In an embodiment, such validation is performed by immediately spending the second-type access tokens designated in the transaction (403) as payment to the admission system 110. As a result, the transaction (403) is marked as spent in a respective block maintained in the blockchain network 130 and cannot be referenced by again by the client 120.

At S495, once the transaction is validated and access tokens are paid, access is granted to the client 120 to access the target resource or service at the protected entity 140.

As mentioned above, each transaction (e.g., the transactions 402 and 403) is a transfer of a certain value of access tokens between the client 120, the admission system 110, and the protected entity 140, each of which may maintain a cryptocurrency wallet. Such information may be logged in an audit system (e.g., the audit system 170, FIG. 1). This allow the admission system 110 and the trust broker 160 to derive the full history of transactions between the client 120, the admission system 110, and the trust broker 160. Further, to provide access tokens, the admission system 110 and the client 120 may exchange their public keys. In order to "spend", the access tokens, the admission system 110 and the protected entity 140 may exchange their public keys. That is, there is no direct transaction with respect to the utilization of the access tokens between the client 120 and the protected entity 140. A key (private or public) is a cryptographic key.

It should be appreciated that the disclosed embodiments provide an improved security solution as the bots would not be able to access and load protected entities with access requests. That is, by shifting the processing to malicious clients (through access tokens processing), the protected entities would remain free to handle legitimate requests with more available computing resources. Further, the protected entities would not require executing authentication processes, thereby further reducing the utilization of computing resources by such entities.

Figure 5:
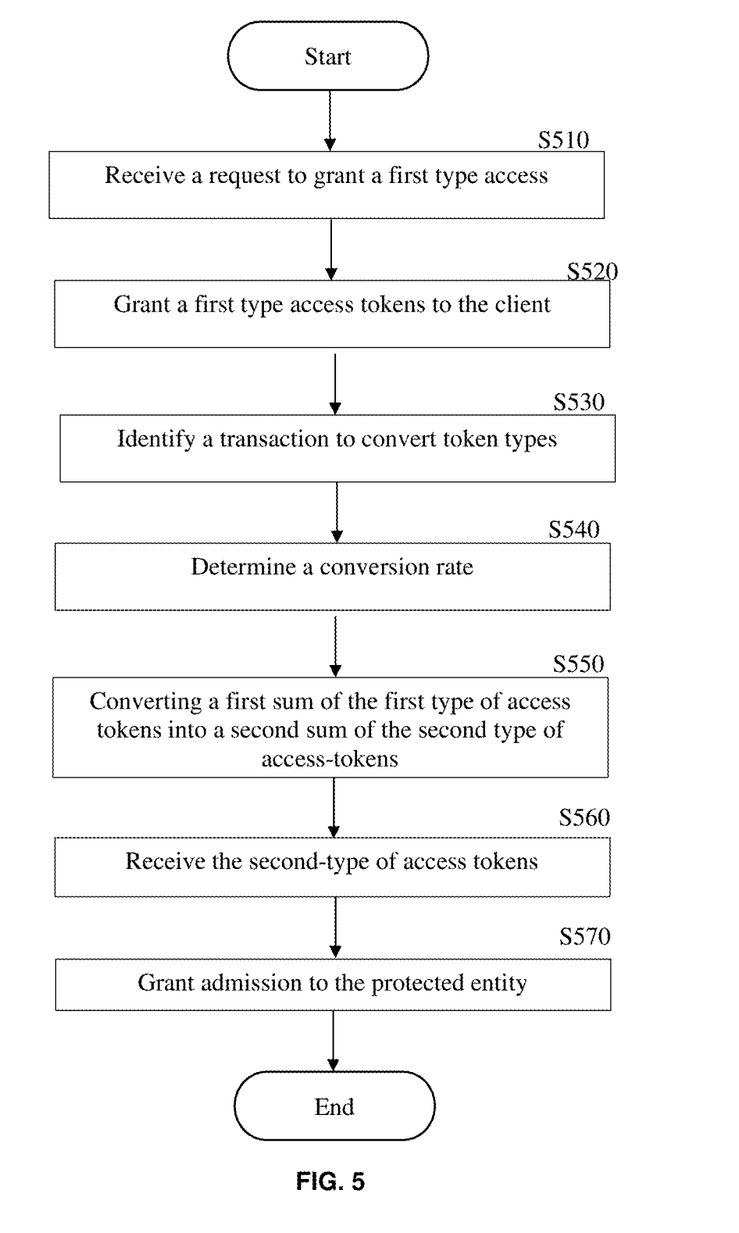
FIG. 5 is an example flowchart illustrating a method for blockchain-based admission to a protected entity according to an embodiment.

FIG. 5 is an example flowchart illustrating a method for blockchain-based admission to a protected entity according to an embodiment.

At S510, a request to grant access tokens of a first-type is received from a client. The client utilizes the first-type access tokens as a means to later access a protected entity.

At S520, upon validating and approving the request, a first-type of access tokens are granted to the client. As noted above, such tokens can be paid (sent) the client directly or through the blockchain network.

At S530, a transaction to convert the first-type of access tokens with access tokens of a second-type is identified on the blockchain network. The transaction data of the conversion transaction may designate, for example, the protected entity to access and a number of available first-type access tokens. The conversion transaction may also be directed to exchange cryptographic identities (e.g., keys or argument of knowledge) between the owners of the first and second access tokens. To this end, the conversion transaction may designate the public keys of, for example, the trust broker and the client.

It should be noted that the request to grant first type of tokens and the conversion transaction are separate and the cryptographic identities are not shared between such requests. Further, no entity (user, owner of the trust broker, etc.) needs to reveal its (real) identity to receive and/or convert tokens. It should be further noted that the entity receiving the first-type of access token and the entity requesting the conversion to the second entity may be different entities.

At S540, a conversion value for converting the first-type of access tokens into the second-type of access tokens is determined. As discussed in detail above, the conversion value is determined based on one or more access parameters. Examples of which are provided above.

At S550, based on the determined conversion value, a first sum of the first-type of access tokens is converted into a second sum of the second-type of access-tokens. The first-type and second-type of access tokens may be different cryptocurrencies. The second-type of access tokens are paid or sent to a client or any other entity requesting the conversion. As noted above, the client uses the second-type of access token to access the protected entity. To this end, an access request is sent from the client to the protected entity. In order to allow access or admission, the protected entity identifies, in the blockchain network 130, the second-type of access tokens of the client, and further spends such tokens to allow payment the admission system. It should be noted that revoking of tokens does not delete any transaction records.

In response, at S560, the second-type of access tokens are received as a payment from the protected entity. At S570, upon receipt of the second-type of access tokens, an admission or access to the protected entity is granted to the client. It should be noted that the number of second-type of access tokens to be converted is determined by the conversion value. There is a minimum number of access-tokens required to the access the protected entity. Such number is determined regardless of the access parameters. The access parameters define the number of first-type of access tokens required to be converted to reach the minimum number of access-tokens. For example, if the minimum number of second-type access tokens is 10, then a client-A may need to convert 40 first-type of access tokens, while a client-B may be required to convert only 5 first-type of access tokens.

In an embodiment, the method discussed herein can be performed by the admission system (110). In such embodiment, the admission system implements or includes the trust broker (160).

Figure 6:
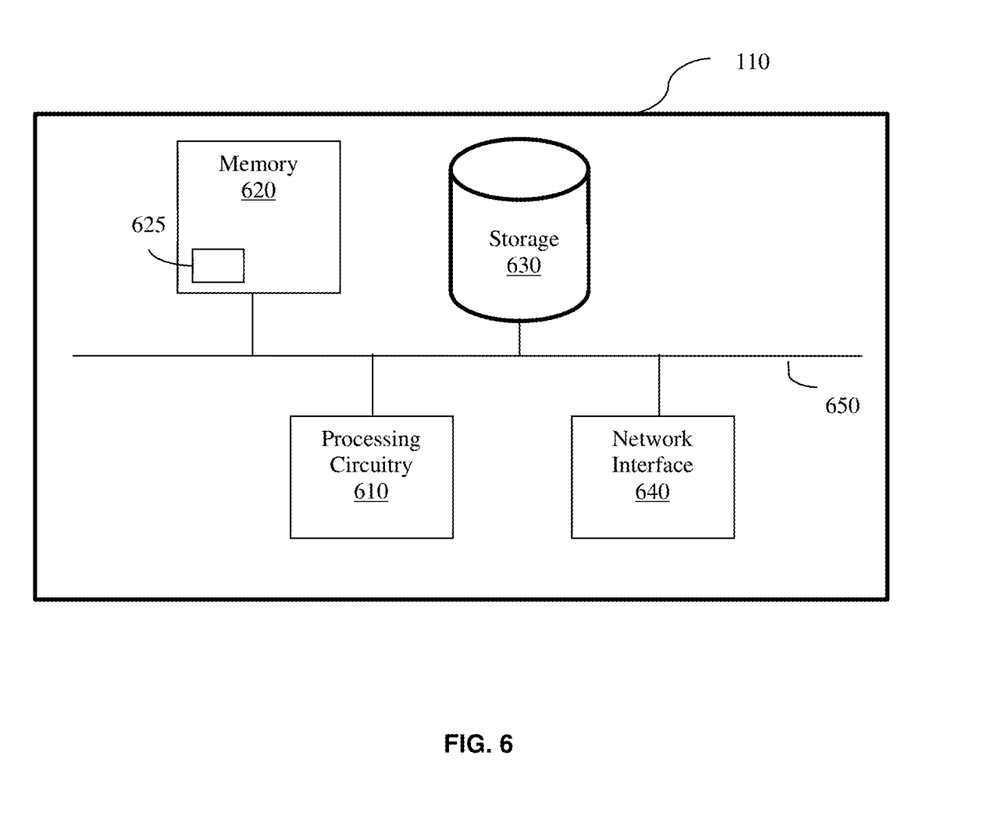
FIG. 6 is an example block diagram of the admission system according to an embodiment.

FIG. 6 is an example block diagram of the admission system 110 according to an embodiment. The admission system 110 includes a processing circuitry 610 coupled to a memory 620, a storage 630, and a network interface 640. In an embodiment, the components of the admission system 110 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), GPUs, system-on-a-chip systems (SOCs), general-purpose microprocessors, microcontrollers, digital signal processors (DSPs), and the like, or any other hardware logic components that can perform calculations or other manipulations of information. In an embodiment, the processing circuitry 610 (or the entire system 110) may be implemented as a Turing machine over the blockchain network.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 610 to perform blockchain-based admission, as discussed hereinabove. In a further embodiment, the memory 620 may further include a memory portion 625 including the instructions.

The storage 630 may be magnetic storage, optical storage, and the like, and may be realized, for example, as flash memory or other memory technology, CD-ROM, Digital Versatile Disks (DVDs), hard-drives, SSD, or any other medium which can be used to store the desired information, such as log of transactions, public keys, and so on.

The network interface 640 allows the admission system 110 to communicate with the blockchain network, clients, trust broker, and protected entities. The network interface 640 further peer-to-peer communication with these elements.

It should be understood that the embodiments described herein are not limited to the specific architecture illustrated in FIG. 6, and that other architectures may be equally used without departing from the scope of the disclosed embodiments.

It should be further noted that the trust broker 160 may be realized using a computing architecture, similar to the architecture illustrated in FIG. 6, and that other architectures may be equally used without departing from the scope of the disclosed embodiments. Further, the memory 620 may include instructions for executing the function of the trust broker 160.

Figure 7:
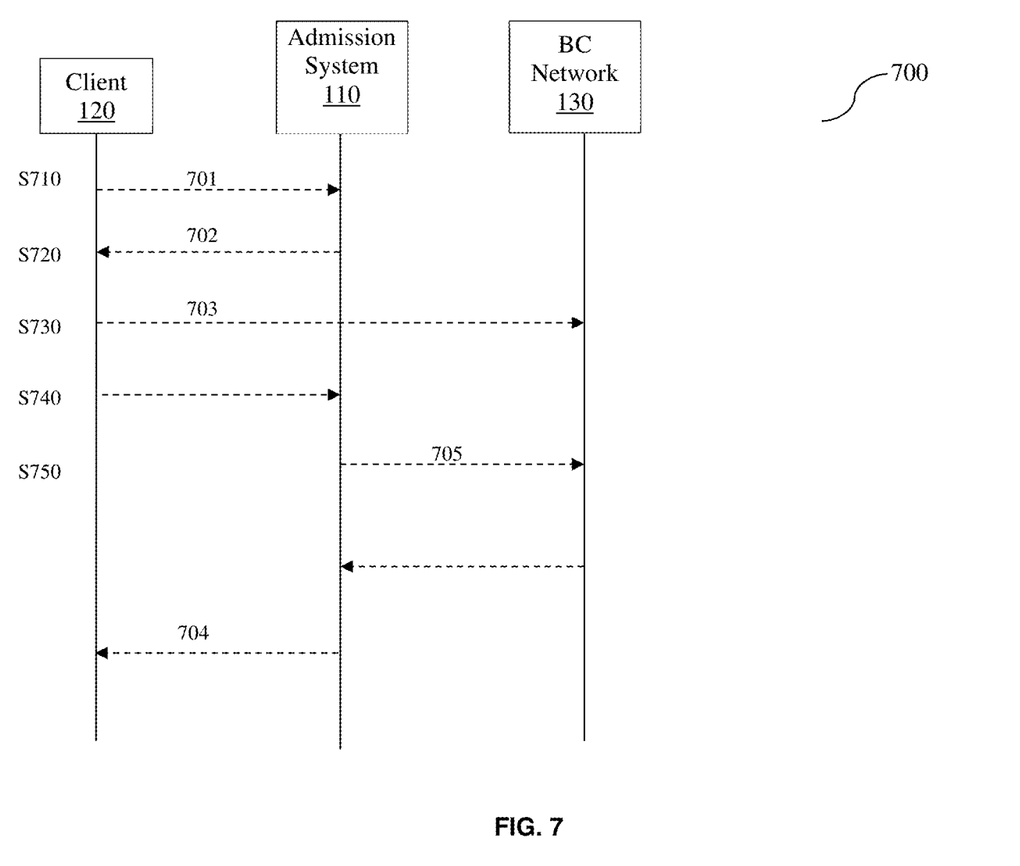
FIG. 7 is a flow diagram illustrating a challenge process utilized by the admission system according to an embodiment.

FIG. 7 is an example flow diagram 700 illustrating a challenge process utilized in the any of the admission processes described above. The elements illustrated in FIG. 7 including the admission system 110, the client 120, the blockchain network 130, and the protected entity 140, are described herein above with reference to FIG. 1.

A S710, the client 120 sends a request (701) to create an anti-bot client identity and request a challenge. The requested identity will be used by the client 120 to access into one or more protected entities 140. In an embodiment, the request (701) may already contain a public key of the client 120. In another embodiment, the request (701) does not include such a key, and the admission system 110 may assign a key to the client 120 and generate a token ID.

The request (701) sent from the client 120 does not need to include any identifying information of a user of the client 120. The request (701) may be sent using a standard layer-7 protocol, such as HTTP or HTTPS. In yet another embodiment, the request (701) can be delivered using the blockchain network 130. The admission system 110 may implement various known and unknown procedures such as, but not limited to, client fingerprinting, client certificates, human identification techniques such as CAPTHAs and other proof of knowledge techniques to further strengthen the understanding of client 120 natures.

In some embodiments, the request (701) may be trigged after the client 120 failed to directly access the protected entity 140. In such case, the protected entity 140 may redirect a request from the client 120 to the admission system 110.

At S720, upon identifying, validating, and approving the request (701), the admission system 110 selects a challenge and sends the challenge to the client 120 together with other needed information such as session IDs or token IDs.

In an embodiment, the admission system 110 can interrogate other sources for information before selecting a challenge. Examples for such sources include external databases, reputation services, the anti-bot system historical records, the protected entity historical records, and the like.

The selected challenge is characterized by the type and optionally complexity and may contain a randomly selectable seed value. As an example, the admission system 110 generates a random seed number, then selects a SHA256 challenge and sets the complexity requesting the client 120 to find a string that together with the seed would result with a SHA256 number with a certain probability.

In other embodiment, the request 701 and the response 702 can be skipped all together if the client 120 choses to follow a non-interactive challenge path. In such non-interactive embodiment, the client 120 can chose a challenge from a pool of challenges available in an external registry (not shown). The registry may be part of the blockchain network 130. In yet another embodiment, the challenge can be based on time of day and the time delta between the selected time of day and the actual time stamp in the 703 blockchain message deposits.

At S730, the client 120 completes the challenge and deposits the result of the challenge in the blockchain network 130.

At S740, the admission system 110 validates the deposited challenge. This can be performed by monitoring the blockchain network 130 or by receiving a notification from the client 120.

At S750, upon validating the challenge's results, the admission system 110 is configured to deposit access tokens directly in the blockchain network 130 via a transaction 704 without waiting for explicit request from the client 120. Alternatively, the admission system 110 can notify the client 120 of such deposit via a message 705.

It should be noted that, that if the challenge fails, no access tokens are deposited to the client 120. The audit system 170 may log any failure to successfully complete a challenge to at least determine the determine trust of access value for the client, as discussed herein above.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for controlling access to a protected entity, comprising:
   receiving a redirected client request to access the protected entity that was denied by the protected entity;
   granting, in response to the received redirected request, access tokens of a first type to a client;
   identifying a conversion transaction identifying a request to convert the first type of access tokens with access tokens of a second type, wherein the transaction designates at least the protected entity;
   determining a conversion value for converting the first type of access tokens into the second type of access tokens, wherein the conversion value is determined based on at least one access parameter;
   converting, based on the determined conversion value, a first sum of the first type of access tokens into a second sum of the second type of access tokens; and
   granting the client access to the protected entity when the sum of the second type of access tokens is received as a payment from the protected entity.

2. The method of claim 1, wherein granting the client access to the protected entity further comprises:
   validating the client based on at least a predefined condition, wherein the first-type access tokens are granted only upon successful validation of the client.

3. The method of claim 1, wherein the first-type access tokens and the second-type access tokens are different types.

4. The method of claim 3, wherein the first-type access tokens and the second-type access tokens are cryptocurrency tokens having different cryptographic identities.

5. The method of claim 1, wherein the least one access parameter weights a risk of false positive of granting access to an illegitimate client and of false negative of denying access of a legitimate client.

6. The method of claim 1, wherein the at least one access parameter is related to any one of: the client, the protected entity, and at least one global indication.

7. The method of claim 1, wherein determining the conversion value further comprises:
   dynamically changing the conversion value based on at least one access parameter.

8. The method of claim 7, wherein the conversion value is dynamically changed based on any one of: per transaction, per access request from the client, and per session.

9. The method of claim 1, further comprising:
   conditionally granting the client access to the protected entity; and
   revoking the conditionally granted access, when a transaction holding the sum of the second type of access tokens is not identified.

10. The method of claim 1, wherein the conversion transaction includes transaction data, a transaction hash value, and a previous transaction hash value, wherein the transaction data includes a unique transaction identifier (ID), a number of available first-type access tokens, an identification of a source granting the first-type access tokens, and an identifier of the protected entity.

11. The method of claim 10, wherein the conversion transaction does not include information identifying at least one of: the client and a user of the client.

12. The method of claim 1, further comprising:
   logging at least the identified conversion transaction and the determined conversion value.

13. A non-transitory computer readable medium having stored thereon instructions for causing one or more processing units to execute the method according to claim 1.

14. An access system for controlling access to a protected entity, comprising:
   a processing circuitry; and
   a memory, the memory containing instructions that when, executed by the processing circuitry, configure the access system to:
   receive a redirected client request to access the protected entity that was denied by the protected entity;
   grant, in response to the received redirected request, access tokens of a first type to a client;
   identify a conversion transaction identifying a conversion of the first type of access tokens with access tokens of a second type, wherein the transaction designates at least the protected entity;
   determine a conversion value for converting the first type of access tokens into the second type of access tokens, wherein the conversion value is determined based on at least one access parameter;
   convert, based on the determined conversion value, a first sum of the first type of access tokens into a second sum of the second type of access tokens; and
   grant the client access to the protected entity when the sum of the second type of access tokens is received as a payment from the protected entity.

* * * * *